United States Patent
Haimer

(10) Patent No.: US 8,887,565 B2
(45) Date of Patent: Nov. 18, 2014

(54) BALANCING DEVICE HAVING ADDITIONAL BEARING

(75) Inventor: Franz Haimer, Hollenbach/Igenhausen (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 517 days.

(21) Appl. No.: 13/139,978

(22) PCT Filed: Nov. 25, 2009

(86) PCT No.: PCT/EP2009/065818
§ 371 (c)(1),
(2), (4) Date: Aug. 23, 2011

(87) PCT Pub. No.: WO2010/072502
PCT Pub. Date: Jul. 1, 2010

(65) Prior Publication Data
US 2011/0290017 A1    Dec. 1, 2011

(30) Foreign Application Priority Data
Dec. 15, 2008  (DE) .......................... 10 2008 062 255

(51) Int. Cl.
*G01M 1/04*  (2006.01)

(52) U.S. Cl.
CPC ....................................... *G01M 1/04* (2013.01)
USPC ............................................. 73/460; 73/472

(58) Field of Classification Search
USPC ................................. 73/460, 472
See application file for complete search history.

(56) References Cited

U.S. PATENT DOCUMENTS

| | | | |
|---|---|---|---|
| 3,832,905 A * | 9/1974 | Himmler et al. | ................. 73/472 |
| 4,149,416 A | 4/1979 | Harant | |
| 4,905,515 A | 3/1990 | Himmler | |
| 6,430,992 B1 | 8/2002 | Goebel | |
| 6,658,936 B2 | 12/2003 | Matsumoto | |
| 7,318,346 B2 | 1/2008 | Haimer | |
| 2005/0235750 A1 * | 10/2005 | Franz | ............................. 73/462 |

FOREIGN PATENT DOCUMENTS

| | | |
|---|---|---|
| CN | 1298484 A | 6/2001 |
| CN | 1374510 A | 10/2002 |
| CN | 1678895 A | 10/2005 |
| DE | 1238240 | 4/1967 |
| DE | 10103305 | 8/2002 |
| EP | 1239275 | 9/2002 |
| EP | 1239275 A2 | 9/2002 |
| GB | 195968 A | 5/1924 |
| WO | 0045983 A1 | 8/2000 |
| WO | 0189758 A1 | 11/2001 |
| WO | 2004011896 A1 | 2/2004 |

* cited by examiner

*Primary Examiner* — Hezron E Williams
*Assistant Examiner* — Gregory J Redmann
(74) *Attorney, Agent, or Firm* — Setter Roche LLP

(57) ABSTRACT

A device for measuring the rotational imbalance of a specimen, having a spindle unit with a spindle, which is embodied to hold the specimen and to allow it to rotate at a testing speed, a holder suspension by means of which the spindle unit is anchored to the machine base in pendulum fashion such that the imbalance forces occurring during the measurement operation are able to move the spindle unit back and forth in a predetermined measuring direction M, and a sensor arrangement that detects at least one imbalance parameter occurring in the measuring direction M during rotation of the spindle, wherein the spindle unit is supported by means of at least one auxiliary bearing that is only able to transmit forces in the direction of a normal N to the measuring direction M.

24 Claims, 8 Drawing Sheets

BALANCING DEVICE HAVING ADDITIONAL BEARING

FIELD OF THE INVENTION

The invention relates to a device for measuring the rotational imbalance of an item such as a machine element or tool holder.

BACKGROUND OF THE INVENTION

It is not uncommon for the spindles of modern rotating machine tools such as drilling or milling machines to operate at very high speeds of 20,000 RPM and more. At these speeds, powerful centrifugal forces are generated with even a slight imbalance. These centrifugal forces not only strain the spindle bearings of the machine tool, but also shorten the service life of the tool and may also impair machining results. The tool holder (with or without a clamped tool) is therefore balanced in a balancing machine before being used in the machine tool. A typical representative of such a balancing machine is described in patent application WO 00/45983.

The central component of balancing machines of the type known from WO 00/45983 is the spindle to which the component to be balanced is fastened, which then brings the component to be balanced to the balancing speed. The spindle travels in a spindle holder and together with it, constitutes the so-called spindle unit. In modern balancing machines, the imbalance is determined directly in the spindle unit—the instantaneous forces occurring in a particular direction in the spindle unit are detected by means of a suitable sensor and constitute a measure for the magnitude and location of the imbalance.

In order to be able to generate the corresponding measurement signal as a function of the respective imbalance, the spindle unit in balancing machines of this kind is suspended in a special oscillating bearing. In the embodiment of WO 00/45983 described below as a representative example, this oscillating bearing is composed of two leaf springs embodied in the form of thin sheets of spring steel. Each of these leaf springs is fastened with its one end to the machine frame and with its other end to the outer circumference of the spindle unit. The two leaf springs are situated spaced apart from each other in a vertical plane extending radially to the spindle rotation axis. In this plane, they resist the action of tensile, compressive, and shear forces, but behave in an essentially flexible fashion in response to force components oriented perpendicular to this plane. The upper of the two leaf springs (in the above-mentioned vertical plane) is loaded with tensile force in the horizontal direction and shear force in the vertical direction while the lower leaf spring is loaded with compressive force in the horizontal direction and with shear force in the vertical direction. In this way, the spindle unit is secured in an elastically cantilevered fashion, thus permitting the occurrence and detection of those imbalance-induced movements of the spindle unit that permit conclusions to be drawn about the position and magnitude of the imbalance.

As shown in FIG. 3 of WO 00/45983, the rotating imbalance force sets the spindle unit essentially into a horizontally oriented pendulum motion around the oscillating bearing mounted at the 12 o'clock position; the pendulum motion has only a very small amplitude that meets practically no resistance from the leaf springs. This results in an actuation of the force sensor protruding like a finger from the machine pedestal at the 3 o'clock position. However, the two leaf springs behave rigidly in the vertical direction so that the spindle unit executes little or no relevant movements in the vertical direction under the influence of the imbalance-induced forces and also executes little or no relevant flexing in the vertical direction under the influence of a specimen that does not exceed the rated load.

The known embodiments—and in particular, embodiments that follow the embodiment principle or suspension principle known from WO 00/45983—have the problem that the bearing of the spindle unit is susceptible to shocks and overloading, i.e., can be damaged or at least disadvantageously influenced by a careless insertion of a specimen or by the insertion of a specimen that is too heavy.

The object of the invention is to eliminate this problem and to disclose a more rugged device that functions properly, even in cases involving heavy specimens.

SUMMARY OF THE INVENTION

Correspondingly, a spindle unit is provided with a spindle for the specimen; this spindle is anchored to the machine base in pendulum fashion by means of a holder suspension. Preferably, a bearing that permits a pivoting motion in one spatial direction is provided at a point on the circumference of the spindle unit, in a position local to this holder suspension. In many cases, this bearing simultaneously predetermines a definite home position of the spindle unit relative to the machine base. In any case, it permits the spindle unit to move back and forth in a predetermined measuring direction due to the imbalance forces occurring during the measurement operation; this back-and-forth motion is detected by means of sensors. In order to further reduce the effect of undesirable transverse forces on the sensors, at least one auxiliary bearing is provided to support the spindle unit. Aside from negligible friction forces, this auxiliary bearing is essentially able to transmit only forces oriented in the direction of a normal to the measuring direction. The auxiliary bearing significantly or completely relieves the above-mentioned pendulum support and the corresponding bearing from weight-related forces and in so doing, its inevitable friction forces and movement limitations have only a surprisingly small negative impact on the measurement precision.

It should be noted that the imbalance measuring device according to the invention does not absolutely have to be a "stand-alone machine," but can also be a component of a multiuse machine such as a shrink-fitting device for shrink-fitting the tool into a tool holder, as described for example in WO 01/89758 A1. It is also advantageous to connect the imbalance measuring device to a presetting device for determining the reference length of a tool clamped in a tool holder. Finally, the imbalance measuring device can also be a component of the machine tool itself.

According to a preferred embodiment, the auxiliary bearing has only a single rolling element. In this way, it fulfills its task of deflecting the weight-induced loads, but allows the spindle unit a majority of its degrees of freedom and thus does not hinder the oscillations that are to be measured in order to ascertain the imbalance.

A particularly favorable embodiment is produced if the single or multiple rolling element(s) is/are situated between the holder elements in the holder suspension so that the holder elements rest against each other in a direction perpendicular to the measuring direction and the rolling element(s) permit the two holder elements to roll against each other in the measuring direction during operation. In such an embodiment, the pendulum bearing and the auxiliary bearing form a unit into which the sensor(s) and possible spring elements provided for prestressing purposes are preferably also integrated. This saves space and makes it possible to provide a replacement unit that in the event of a defect can be easily replaced and remedies all conceivable bearing and sensor malfunctions.

Another preferred embodiment has another auxiliary bearing in the form of a counter-bearing built into it, which is situated on the circumference of the spindle unit, essentially diametrically opposite the first auxiliary bearing, which is accommodated in the holder suspension. The counter-bearing includes at least one, preferably only one, rolling element. This achieves an even better support without any further perceptible limitation to the mobility of the spindle unit in the measuring direction, even with regard to possible wobbling motions of the spindle unit.

At any rate, this is the case when, as likewise preferably provided, two sensors are installed spaced apart from each other and the auxiliary bearing(s) is/are installed essentially midway between the two sensors, viewed in the direction of the spindle rotation axis; each of the two latter measures is also useful in and of itself.

Other advantages and functions of the invention ensue from the exemplary embodiments explained below in conjunction with the various figures, whose graphical disclosure content is essential to the invention.

DETAILED DESCRIPTION OF THE PREFERRED EMBODIMENTS

Figure 1:
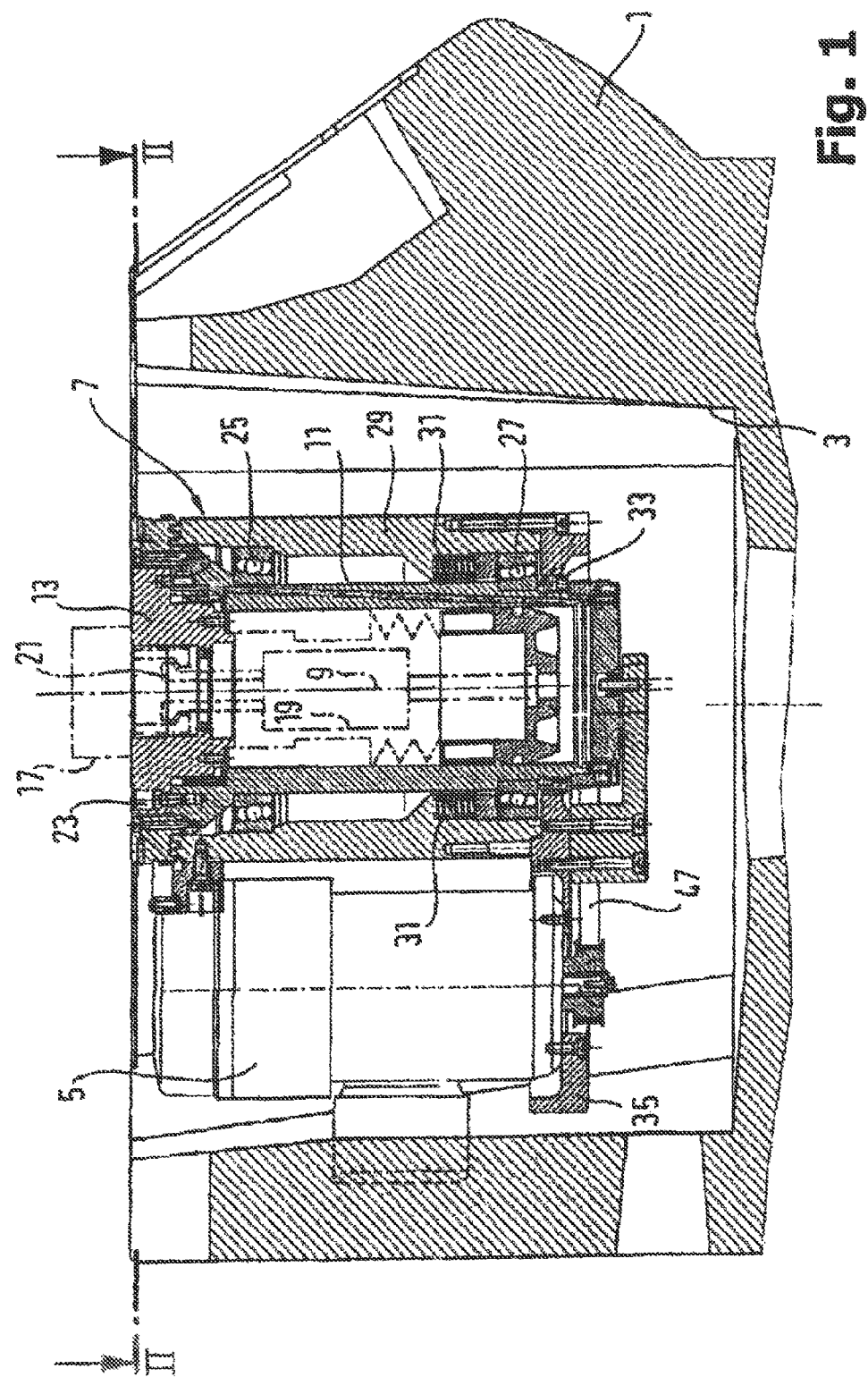
FIG. 1 is an axial longitudinal section through a first exemplary embodiment according to the invention of a balancing machine for tool holders, viewed along a line 1-1 in FIG. 2; however in FIG. 1, the one auxiliary bearing according to the invention with which this exemplary embodiment is equipped is situated behind the plane of the drawing and is therefore hidden from view.
Figure 2:
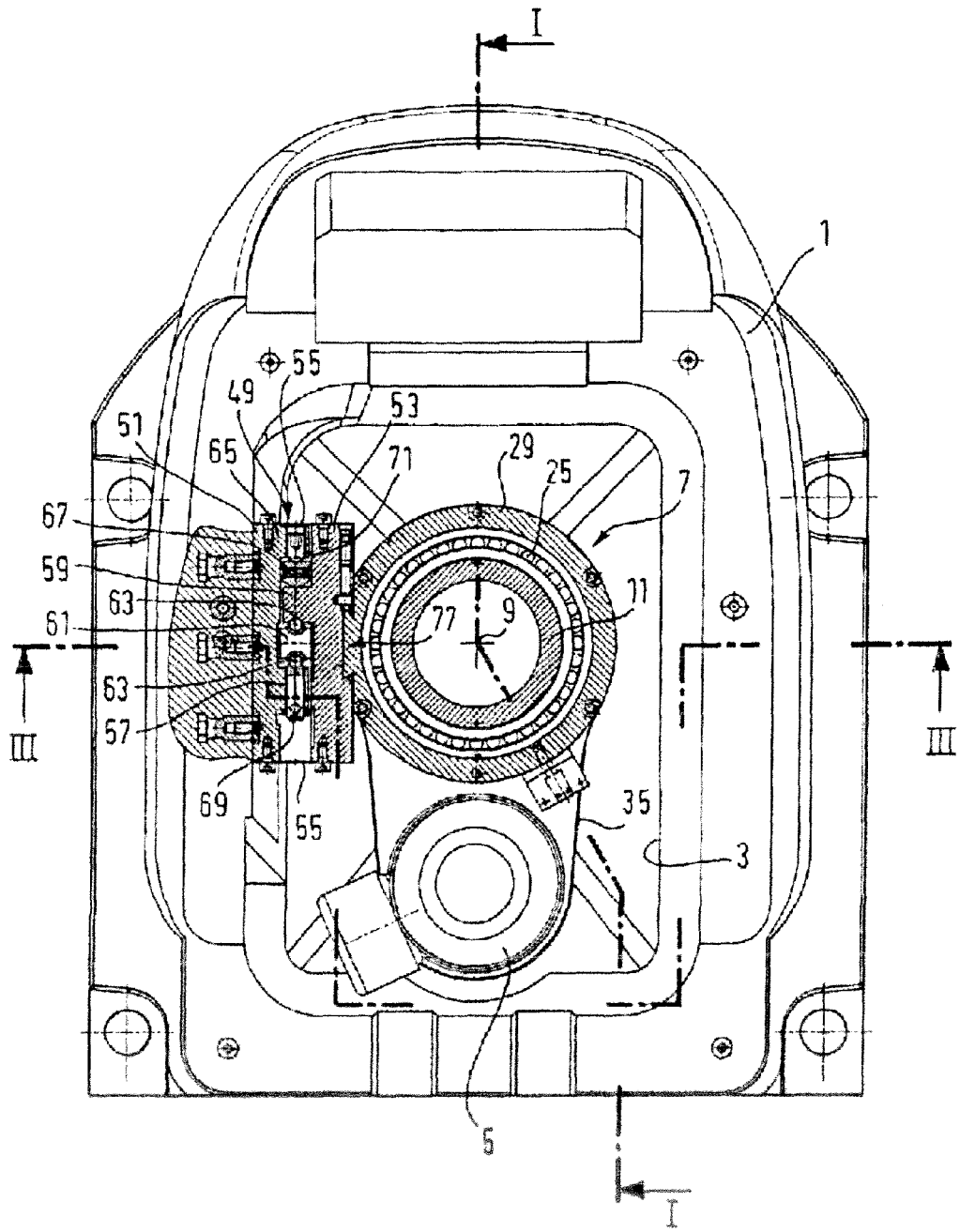
FIG. 2 is an axial cross-section through the first exemplary embodiment of the balancing machine, viewed along a line II-II in FIG. 1; however in this case, the auxiliary bearing according to the invention is situated underneath the plane of the drawing and is therefore hidden from view.

The balancing machine, general views of which are shown in FIGS. 1 and 2, has a housing 1 serving as a machine base. To make the balancing machine insensitive to vibrations and to give it optimal steadiness, the housing 1 is composed of a heavy material such as concrete or the like. In a chamber 3 that is accessible from above, the housing accommodates a spindle unit 7 that is driven by an electric motor 5. The spindle unit 7 has a rotating spindle 11 whose rotation axis 9 is preferably oriented vertically; the vertical orientation of the spindle prevents the force of gravity from influencing the measurement result in any way.

At its upper end, the spindle is equipped with an operationally replaceable coupling adapter 13 that has a receiving opening centered on the rotation axis 9. This receiving opening is used for connecting a standard specimen, labeled 17, that is to be balanced. The specimen can be a tool holder, for example in the conventional steep taper design, or can be a hollow shaft taper holder (HSK holder) or also another rotor. The spindle 11 is embodied in the form of a hollow spindle. It contains an actuating unit 19, which uses a collet chuck 21 to hold the tool holder 17 in the coupling adapter 13 during the imbalance measurement. The coupling adapter 13 is fastened to the spindle 11 by means of screws 23 and is replaceable i.e. can be adapted to the type of tool holder to be measured.

The spindle 11 is supported without play by two ball bearings 25, 27 that are spaced axially apart from each other in a hollow cylindrical spindle holder 29; axial bearing play is compensated for by prestressing springs 31 and a spring nut 33 encompassing the spindle 11.

The electric motor 5 is situated axially parallel to the rotation axis 9, next to the spindle unit 7 and, together with the spindle holder 29, is flange-mounted onto the same side of the connecting yoke 35. An endless belt drive 47 produces the drive connection between the electric motor 5 and the spindle 11, i.e., between their belt pulleys.

In this exemplary embodiment, the angle of the imbalance vector to be measured is determined directly at the spindle 11 and not at the electric motor as in conventional imbalance measuring devices—but this does not limit the invention to this approach.

The structural unit comprised of the electric motor 5 and spindle unit 7 in this exemplary embodiment is secured to the housing or machine base 1 by means of a holder suspension 49 detachably fastened to the spindle holder 29. In this exemplary embodiment, the holder suspension 49 includes two essentially plate-shaped holder elements 51, 53. The first holder element 53 is fixed relative to the spindle unit 7—in the present case by being fastened to the spindle holder 29, possibly also through the use of an intermediate piece. The second holder element 51 is fixed relative to the machine base 1; here, too, it is immaterial whether this holder element is fastened directly to the machine base or is fastened to an intermediate piece that is in turn correspondingly fastened to the machine base.

Figure 3:
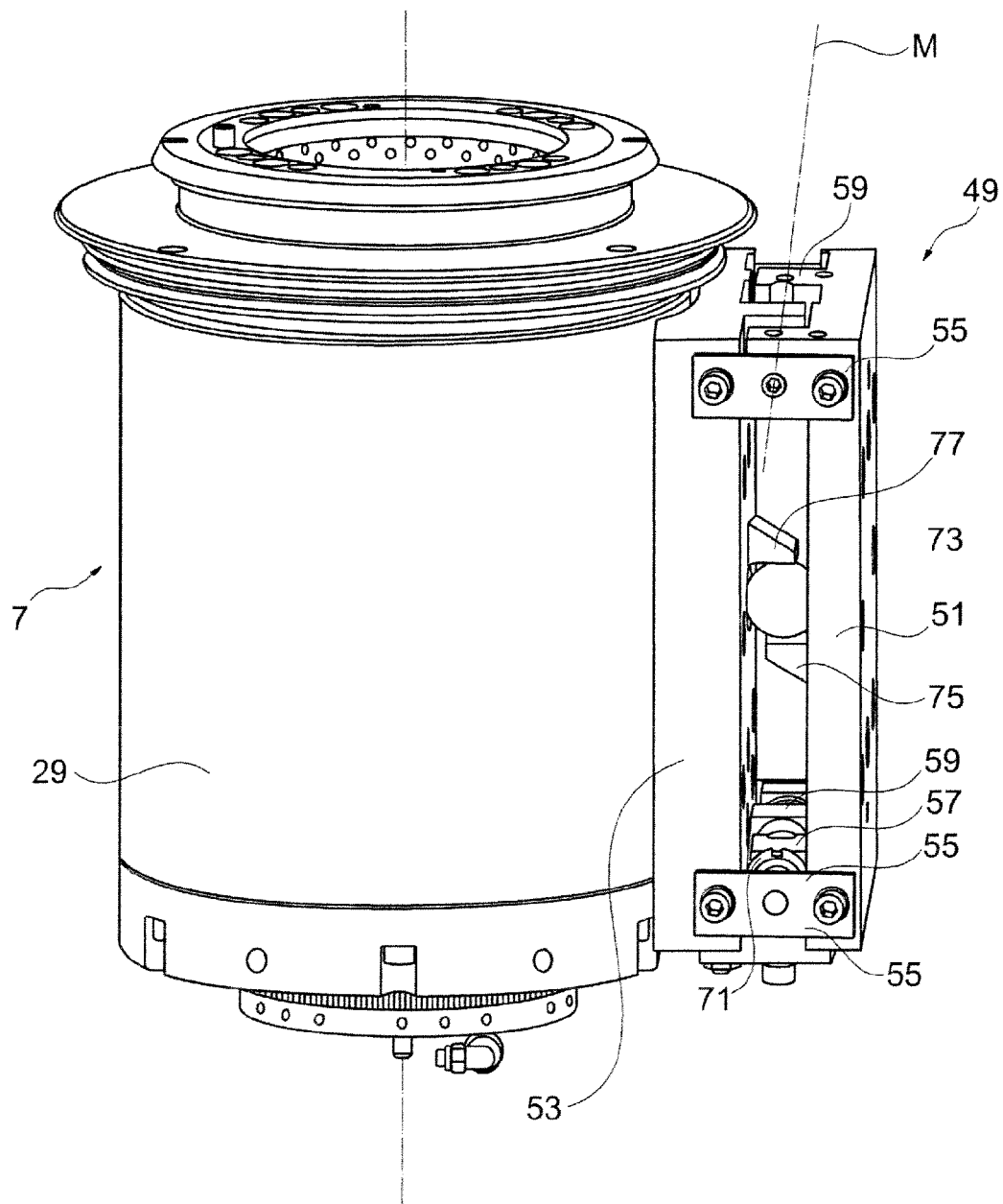
FIG. 3 is a perspective side view of the first exemplary embodiment of the balancing machine, showing the one auxiliary bearing according to the invention, which is situated between the two holder elements of the holder suspension of the spindle unit.

As is particularly clear from FIGS. 2 and 3, the two holder elements 51, 53 are fastened spaced a predetermined distance apart from each other by a plurality of spacers—here embodied in the form of leaf spring elements 55. In the present case, a total of four leaf spring elements are used. Two of the leaf spring elements are situated one above the other on the one side of the two holder elements and are situated in a common plane parallel to the rotation axis 9, see FIG. 3 in particular. This plane is referred to below as the main plane of the leaf spring elements. Two additional leaf spring elements, arranged in corresponding fashion, are situated on the opposite side of the holder elements in another main plane.

The leaf spring elements 55 are essentially rigid in opposition to force components that act on them in the direction of their main plane. However, the leaf spring elements only offer a negligible bending resistance to the force components that act on them in the direction normal to their main plane.

The holder elements 51, 55 are thus secured to each other, spaced apart by an essentially constant distance, but when influenced by imbalance-induced forces, can move relative to each other in a direction that essentially corresponds to the normal to the main plane of the leaf springs—this direction is also referred to below as the measuring direction. Strictly speaking, a certain—even if only slight—rotating motion of the holder elements relative to each other is also possible in this case. Such a rotating motion can occur, for example, due to the fact that the two leaf springs situated in the lower region are momentarily deflected more powerfully than the two upper leaf springs.

It should be generally noted that the movements that the respective imbalance induces in the spindle unit are slight. In tools that are intended for operating speeds of 20,000 RPM or more, these movements typically lie in the range of ± a few hundredths of a millimeter up to a few tenths of a millimeter.

This movement of the holder elements 51, 53 is measured so as to obtain a signal that enables a conclusion to be drawn about the magnitude and location of the imbalance. To this end, a plurality of sensors, preferably two of them, are situated between the holder elements in the measuring direction. Since only small movements are to be detected, force transducers are used, usually of the piezo-electronic type. Sensors that detect the instantaneous speed and/or acceleration of the holder elements relative to each other are conceivable, but remain theoretical with such small movements.

As is clear from FIGS. 2 and 3, one of the sensors is situated between the holder elements 51, 53 close to the upper end of the spindle unit 7 while the other of the two sensors is situated between the holder elements 51, 53 close to the lower end of the spindle unit 7. Such a sensor arrangement makes it possible to measure imbalances that are unevenly distributed along the rotation axis and therefore result in wobbling motions of the spindle rotation axis 9.

As is particularly clear from FIG. 2, each of the holder elements is provided with a projection 57, 59 for each of the sensors. Between each pair of these projections 57, 59, a sensor 61 is mounted, which records the force that these two projections exert on each other under the influence of the imbalance.

As is clear from FIG. 2, the force sensors 61 rest by means of contact ball bearings 63 against the projections 57, 59 associated with them in order to isolate the sensors as much as possible from the influence of potential transverse forces that can corrupt measurement results. The mounting of the sensors on the holder elements and the clamping of the holder elements relative to each other will be described in greater detail further below.

Despite the above-mentioned contact ball bearings 63, however, the occurrence of transverse forces on the sensors 61 must be avoided as much as possible; it is therefore necessary to prevent the plate-shaped holder elements 51, 53 from moving transversely relative to each other, i.e., in the direction of a normal N to the measuring direction M (in the vertical direction in the present case), even with only a slight amplitude. This can occur, for example, when a heavy specimen is inserted into the spindle unit or is dropped. In the extreme case, this can result in damage to the holder suspension 49.

According to the invention, an auxiliary bearing 73, 75, 77 is provided in the gap between the two holder elements to prevent this from occurring. This auxiliary bearing includes a ball bearing 73 via which the holder element 53 associated with the spindle unit 7 is supported against the holder element 51 associated with the machine base, see FIG. 3. For this purpose, the holder element 53 associated with the spindle unit is provided with a support 77 that protrudes into the gap, by means of which it presses onto the ball bearing 73 from above. The ball bearing in turn rests against a base support 75 that belongs to the other holder element 51 and protrudes into the gap.

This ball bearing 73 permits the two holder elements 51, 53 to roll against each other essentially unhindered in the measuring direction. But in a direction perpendicular to the measuring direction, in this case namely in the vertical direction, the two holder elements 51, 53 are connected via the ball bearing 73 and the leaf spring elements 55 to an intrinsically almost rigid holder suspension 49.

The auxiliary bearing or more precisely the ball bearing 73 is arranged so that it is situated essentially halfway between the upper and lower sensor. Because of this arrangement, the auxiliary bearing does not hinder the function of any of the sensors, even if the influence of corresponding imbalances causes the spindle unit to execute a kind of minimal pivoting motion around the ball bearing 73 in which the upper part of the holder element 53, for example, moves in the measuring direction and the lower part of the holder element moves in the opposite measuring direction.

The ball bearing 73 is secured in captive fashion in that its sides, which are not situated in the flow of force, engage with the required amount of play in a small hollow that is provided for this purpose in each of the holder elements close to the support 77 and close to the base support 75. These will be described in greater detail further below.

This embodiment can be implemented very simply and without incurring any appreciable costs. Ball bearings are standard components that can be obtained at a low cost. Also, it makes no difference in terms of cost to provide the support 77 and the base support 75 as additional equipment to the two holder elements 51, 53, which are present anyway.

A decisive advantage is the fact that the holder suspension 49, which is embodied according to the invention and accommodates the ball bearing between the holder plates 51, 53, constitutes a structural unit that is intrinsically closed to a large extent and only has a few definite interfaces with the surrounding components. This unit can be installed with ease, without having to take into account any other bearings. This can be referred to as a so-called "cartridge embodiment".

The advantage of such an intrinsically closed unit comes into play primarily when the balancing machine must be repaired on site. This is true because particularly when the two holder elements 51, 53 are provided with a dovetail guide or a similar indexing, which predetermines their precise position on the spindle unit and machine base, respectively, even when being reinstalled on them, the holder suspension 49 can be easily installed and removed or replaced on site without requiring readjustment of the machine. The problems affecting the leaf springs, support bearing, or sensors and causing the machine to malfunction can then be reliably and quickly remedied by replacing the entire holder suspension 49. It is thus possible to precisely repair the defective holder suspension again at the plant.

Another advantage lies in the fact that the contour of the flange surfaces of the cartridge-like holder suspension 49 is not influenced by the ball bearing 73 accommodated in the gap between the holder plates 51, 53. As a result of this fact, it is also suitable to use the holder suspension 49 according to the invention for purposes of retrofitting and as a replacement for previously installed holder suspensions identical to it, which are mounted on the flange.

It should be noted that despite the presence of the auxiliary bearing 73, 75, 77, the leaf springs 55 are generally still mounted on the two holder plates in order for the leaf springs to provide additional securing in the vertical direction as well. Theoretically, however, it would also be conceivable for the leaf springs to now be connected to the holder plates so that they articulate in the vertical direction. It is thus possible, where necessary, for all vertical forces to be deflected via the ball bearing 73.

As mentioned above, the holder suspension 49 according to the invention has still other advantageous features that are of interest specifically for a "cartridge embodiment" and should therefore be described in greater detail now.

One of the holder elements (e.g., the holder element 51, see FIG. 2), is provided with another projection 65 in addition to the projection 57 so that the projection 59 of the other holder element 53 is situated between these two projections 57 and 65. An elastic prestressing element 67 is clamped between the projections 65 and 59, and provides for a certain amount of prestressing of the sensor 61. Adjusting screws 69, 71 situated in the projections 57 and 65 at opposite ends from each other in the measuring direction make it possible to adjust the position of the sensor 61 and to adjust the prestressing force of the prestressing element 67.

Each of the two sensors 61 and the resilient prestressing element associated with it is thus supported against the opposing holder element 53 so that the projection 59 of this holder element 53 transmits the forces exerted on it during operation to the other holder element 51 via the prestressing element 67 or via the force sensor 61 (if a speed or acceleration sensor is used instead of a force sensor, then the sensor is connected in parallel with another spring element, which is not shown here). This ensures that the holder elements are always coupled to each other directly and the leaf spring elements 55 are not stressed, i.e., are not appreciably used to transmit force between the holder elements in the measuring direction.

It should also be noted that the leaf spring elements 55 are associated in pairs with the force sensors 61 and are situated opposite each other, likewise in pairs, in the measuring direction. Otherwise, the prestressing elements 67 are supported in articulating fashion in order to avoid transverse forces between bearing points, as shown in FIG. 2.

The force sensors 61 situated spaced apart from each other at the upper and lower end of the spindle unit 7 are preferably supported in opposite directions on the two holder elements 51, 53. As shown by FIG. 2 for the upper force sensor 61, it is supported relative to the rotation axis 9 in clockwise fashion against the projection 59 of the holder element 53 associated with the spindle and in counterclockwise fashion against the projection 57 of the holder element 51 associated with the housing. By contrast, the lower force sensor 61 is supported in clockwise fashion against the holder element 51 associated with the housing and in counterclockwise fashion against the holder element 53 associated with the spindle. The advantage of this arrangement is the fact that with a tilting movement of the spindle 11, both of the force sensors 61 are either loaded with pressure in the same direction or relieved of pressure in the same direction. As a result, characteristic curve differences of the force sensors that depend on the force direction do not affect the measurement result.

Figure 4:
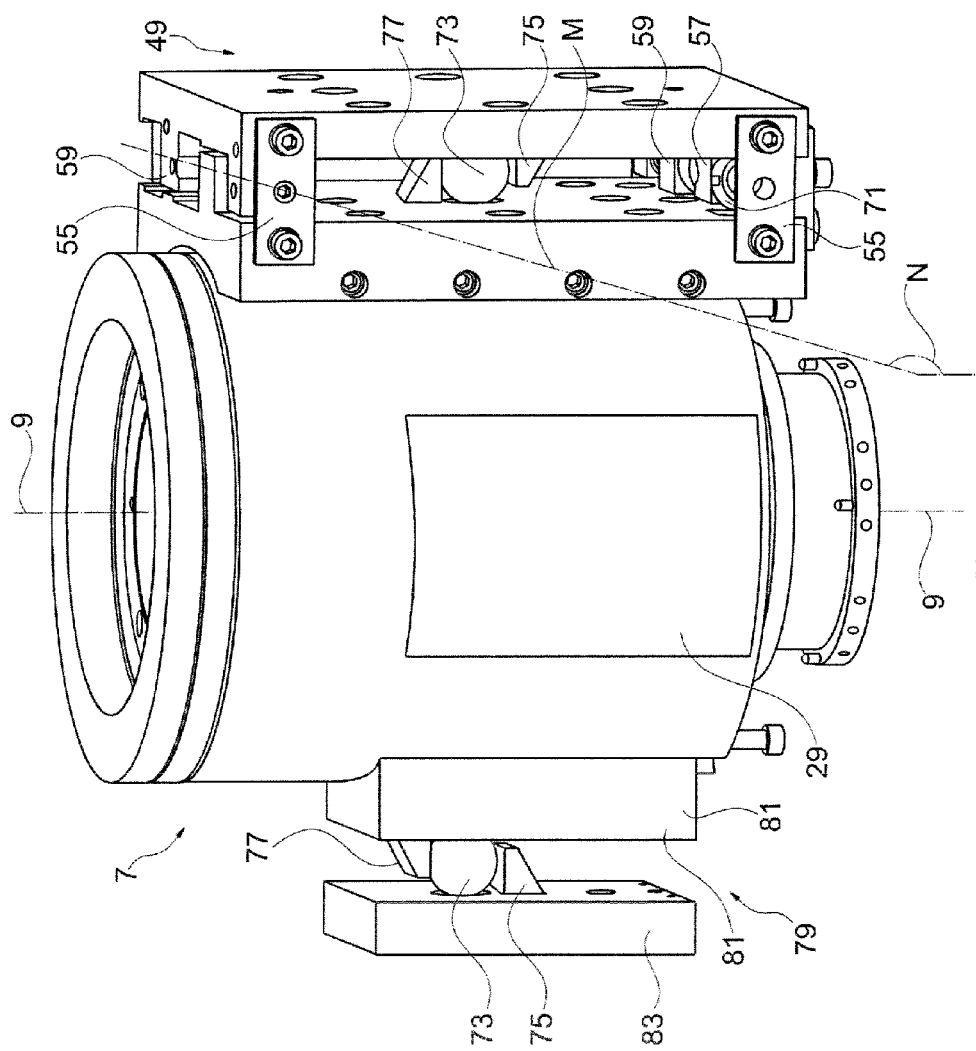
FIG. 4 is a perspective side view of a second exemplary embodiment of the balancing machine, showing the first auxiliary bearing according to the invention, which is situated between the two holder elements of the holder suspension of the spindle unit, and a view of the second auxiliary bearing situated on the side diametrically opposite the holder suspension.

FIG. 4 shows a second exemplary embodiment of the invention. Provided that nothing to the contrary is stated below, this second exemplary embodiment corresponds to the first exemplary embodiment and therefore the description given above also applies to the second exemplary embodiment.

The difference in this second exemplary embodiment of the invention is the fact that in addition to the holder suspension 49 with the integrated bearing 73, 75, 77, another auxiliary bearing in the form of a counter-bearing 79 is used, which is as a rule situated diametrically opposite the holder suspension 49, in fact at a height that essentially corresponds to halfway between the upper and lower sensor 61. For this purpose, the spindle unit has a counter-bearing plate 81 mounted on it, which presses via another ball bearing 73 against a counter-bearing plate 83 associated with the machine frame 1, thus preventing a bending moment, which acts on the holder suspension 49, from occurring in the spindle unit 7. In the region of the ball seat, the two counter-bearing plates 81, 83 are in principle embodied in precisely the same way as the two holder elements 51, 53 at corresponding locations.

The design of this exemplary embodiment is very favorable, particularly when the spindle unit 7 is very heavy and/or the motor 5 and spindle unit 7 are combined as a block to form a single unit. Specifically with this embodiment type, it is also possible either for the leaf springs to be embodied as very thin and therefore very flexible and/or for them to be flange-mounted to the holder plates in an articulating fashion in the vertical direction. A particularly thin embodiment of the leaf springs promotes reaction precision.

Figure 5:
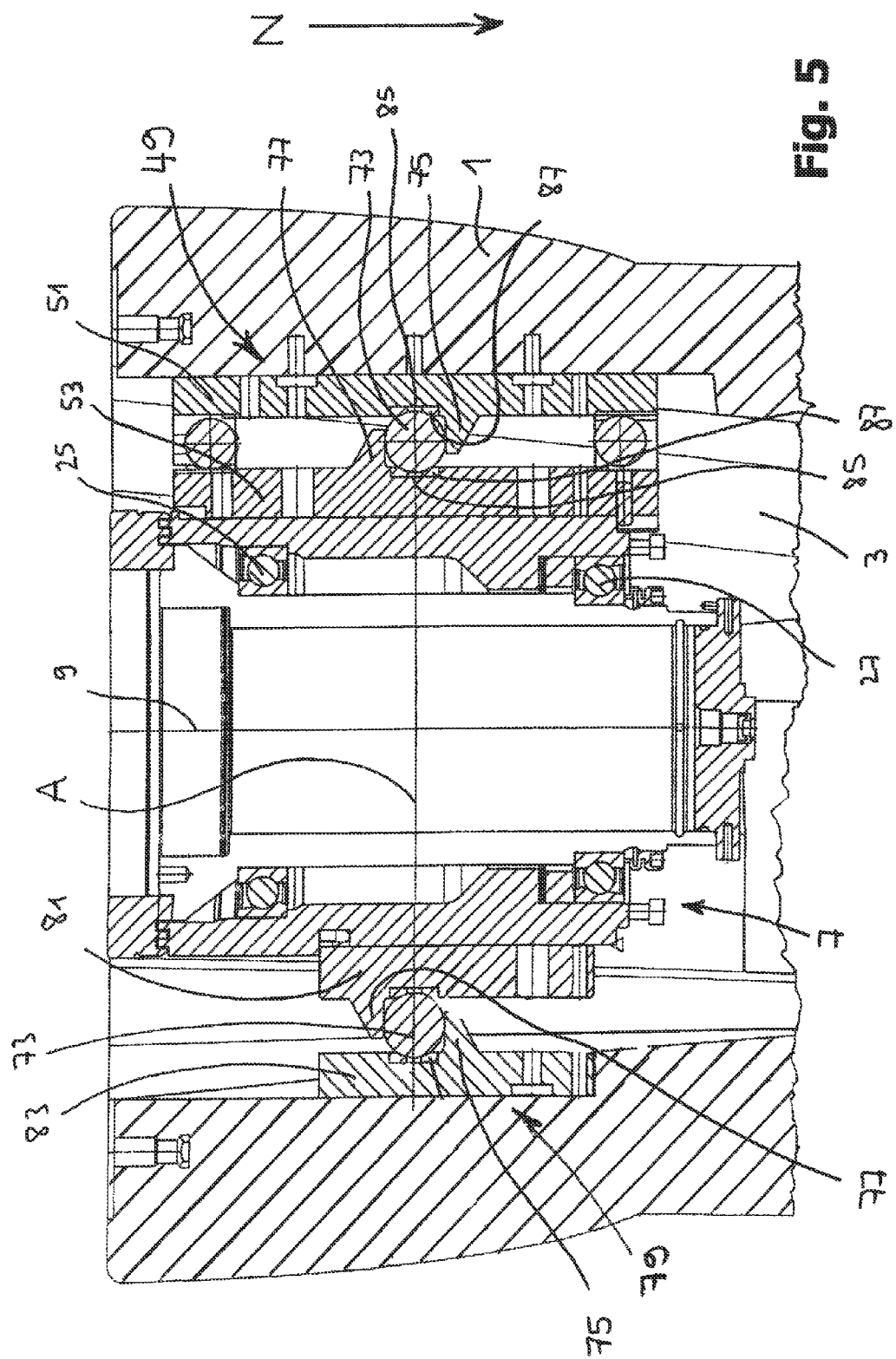
FIG. 5 is an axial longitudinal section through the second exemplary embodiment of a balancing machine.

FIG. 5 shows an axial section through the second exemplary embodiment shown in FIG. 4. This sectional view clearly demonstrates how the ball bearings 73 are held in their proper position—respective recesses, bores, or hollows 85 are provided on the two holder plates 51, 53 and on the two counter-bearing plates 81, 83 and accommodate the flanks of the balls 73 situated outside the direct flow of force. Stated more precisely, each hollow 85 accommodates a plastic insert 87 that encompasses the flank of the ball 73 oriented toward it with the required amount of play, thus holding the ball bearing 73 without preventing it from being able to move as required.

Figure 6:
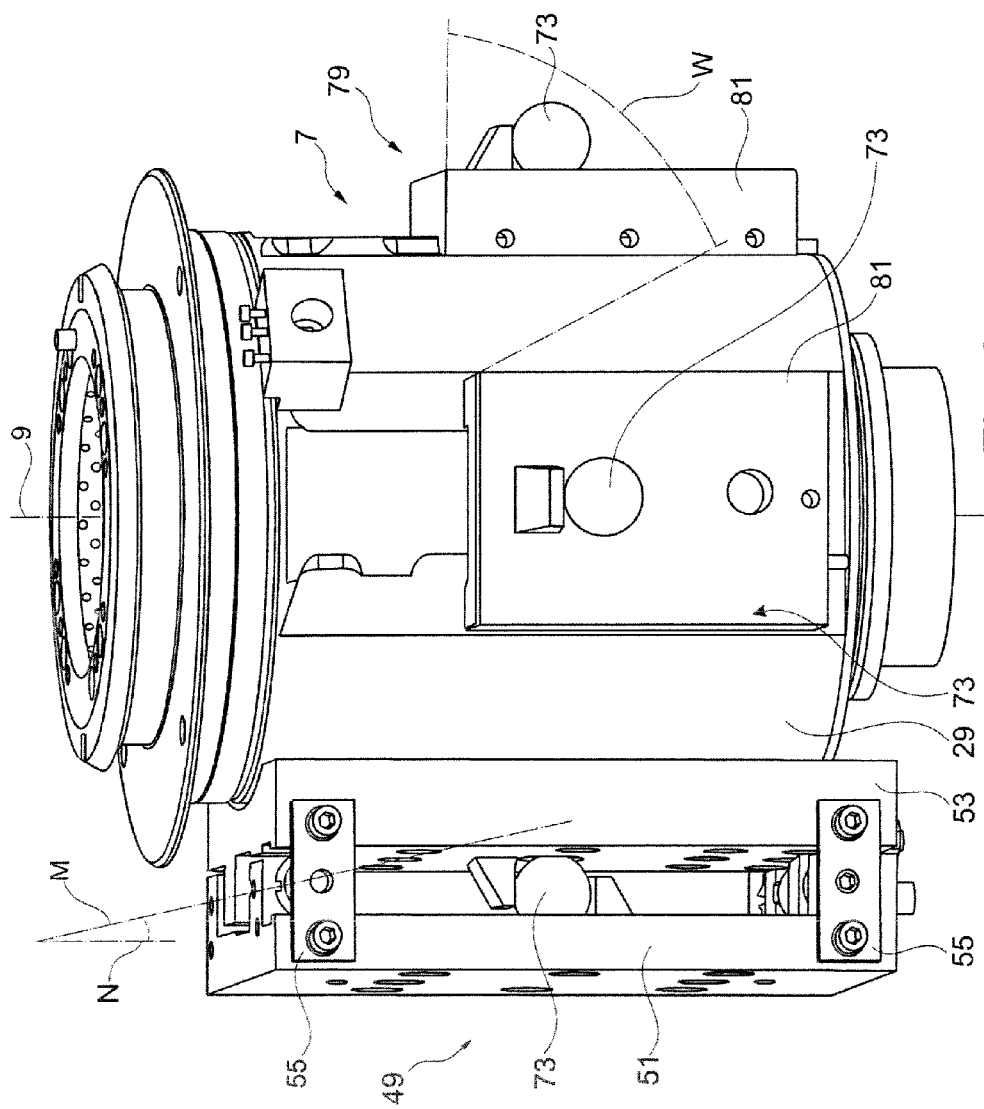
FIG. 6 is a perspective side view of a third exemplary embodiment of the balancing machine, which is distinguished by the fact that the balancing machine is equipped with four auxiliary bearings situated spaced apart from one another by 90° around the circumference of the spindle unit.
Figure 7:
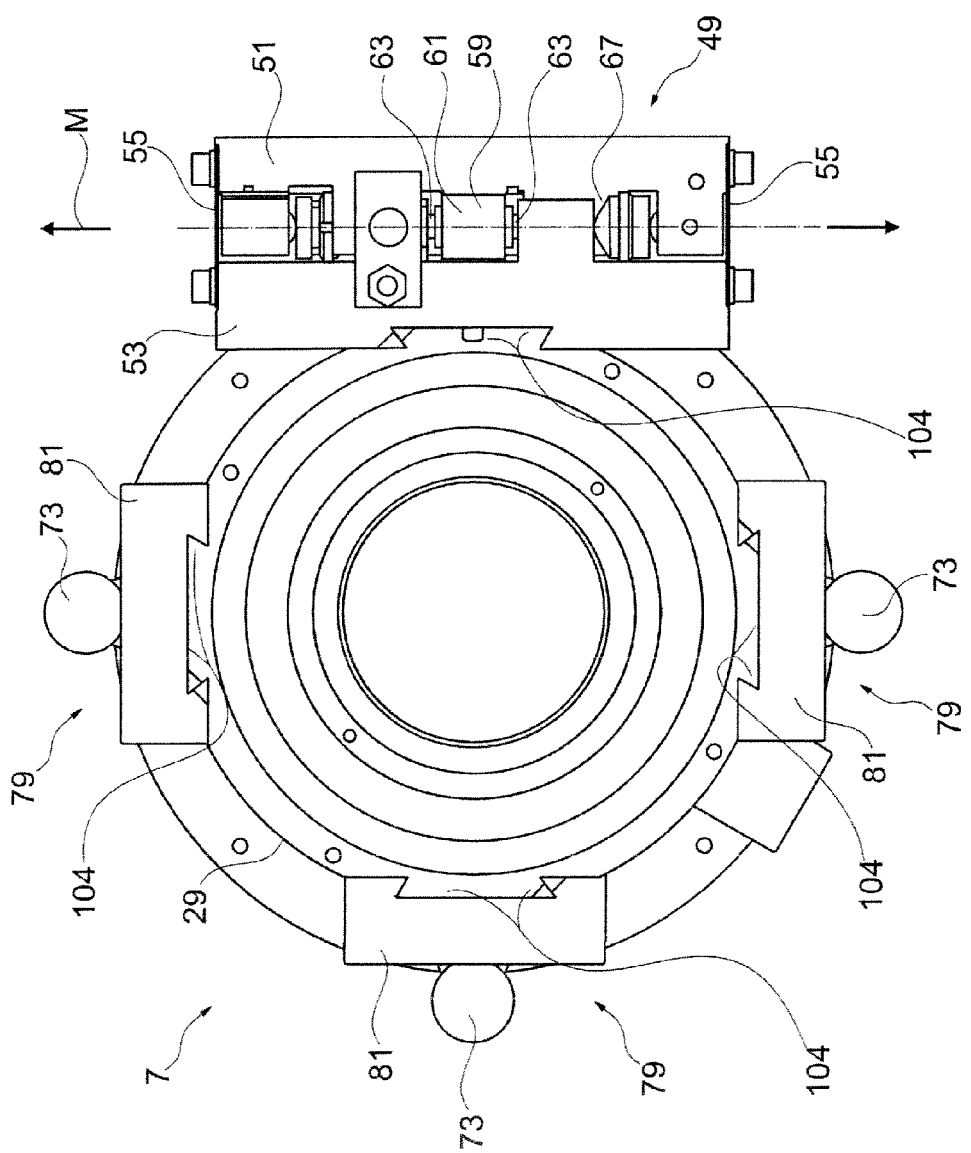
FIG. 7 is a top view of the third exemplary embodiment of the balancing machine shown in FIG. 6.

FIGS. 6 and 7 show a third exemplary embodiment of the invention. Provided that nothing to the contrary is stated here, this third exemplary embodiment corresponds to the first and second exemplary embodiments and therefore the descriptions given above also apply to the third exemplary embodiment.

This third exemplary embodiment differs from the first and second exemplary embodiments by the fact that not just a single auxiliary bearing, but several auxiliary bearings in the form of counter-bearings 79 are used. To be specific, a total of three counter-bearings 79 are used here, which are situated offset from one another by (essentially) 90° in the circumference direction, as shown in FIG. 7. Each of these counter-bearings 79 corresponds to the counter-bearing described in connection with the second exemplary embodiment, thus minimizing parts complexity. This achieves a four-point support that holds the spindle unit very rigidly in position perpendicular to the measuring direction M (the vertical direction in this specific case), which is advantageous when balancing very heavy specimens but is disadvantageous to the extent that it hinders the tilting of the spindle unit as a result of which it becomes more difficult to draw conclusions about the position of the imbalance in the axial direction of the specimen.

Furthermore, FIG. 7 shows quite clearly how the holder suspension 49 and counter-bearings 79 are each affixed to the spindle unit 7 by means of a respective dovetail guide 104 and as a result can be removed from the spindle unit 7 and reinstalled on it in a reproducible fashion with regard to their precise position.

It should be noted that in all of the previously described exemplary embodiments, the ball bearings 73 of the counter-bearings 79 in particular, can be alternatively embodied in the form of rollers instead of balls. These optional rollers are then situated so as to permit a rolling action in the measuring direction M, thus offering no hindrance to the mobility of the spindle unit in the measuring direction.

Purely from a patent law standpoint, it should be noted at this point in that as an equivalent to a support on rollers, it would naturally also be conceivable to provide a support on rods, which extend with their longitudinal axes parallel to the spindle rotation axis and which are embodied as flexible in the measuring direction or are connected in articulating fashion in the measuring direction and therefore support the spindle unit (only) in the vertical direction, while permitting oscillations in the measuring direction M.

Figure 9:
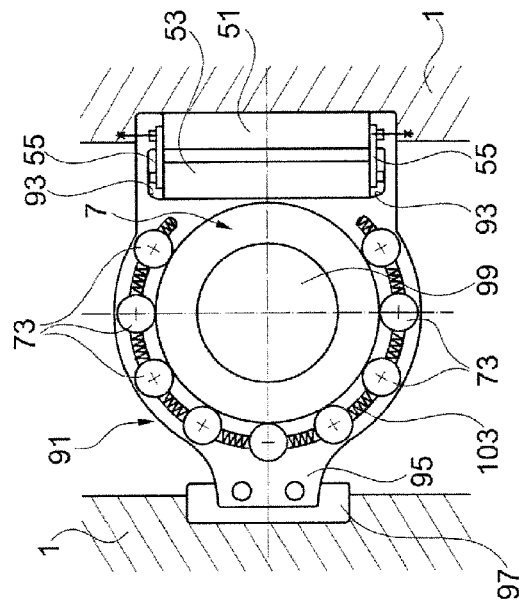
FIG. 9 is an axial cross-section through the fourth exemplary embodiment of the balancing machine in FIG. 7.
Figure 8:
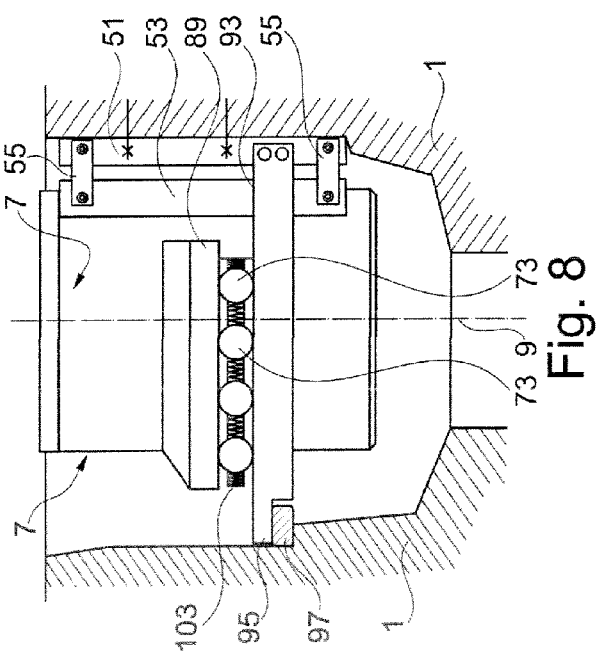
FIG. 8 is a side view of a fourth exemplary embodiment of the balancing machine, which is distinguished by the fact that the balancing machine is equipped with a bearing ring that largely encompasses the circumference of the spindle unit.
Figure 11:
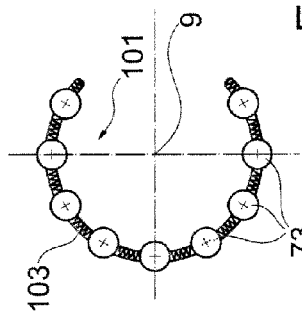
FIG. 11 is a detail view of the bearing cage of the ball bearing ring.
Figure 10:
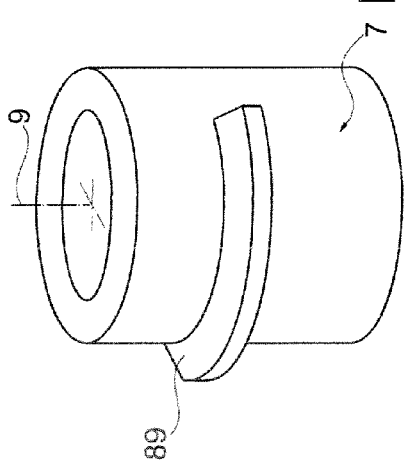
FIG. 10 is a schematic side view of the spindle unit.

FIGS. 8 through 10 show a fourth high-precision exemplary embodiment of the invention.

In this case, the spindle unit 7 is supported not only at certain points by roller elements or by one or more balls 73, but is instead supported over a large portion of its circumference. For this purpose, the spindle unit 7 or its spindle holder 49 is provided with a support ring 89. This support ring 89 is functionally associated with a counterpart ring embodied in the form of the bridge 91 in this exemplary embodiment. The bridge 91 is provided with a fork section 93 at its one end and is provided with a support tab 95 at its other end. The fork section 93 embraces and is fastened to the holder plate 53 associated with the machine frame 1. The support tab 95 rests, possibly with the interposition of a support piece 97, against the machine frame 1. The spindle unit 7 is inserted into the central opening 99 of the bridge 91, extends through it, and is supported with its support ring 89 on the bridge 91 via a ball bearing ring 101. The ball bearing ring 101 is composed of a number of ball bearings 73, which are held in position by a conventionally embodied cage 103.

In this way, the spindle unit 7 is precisely supported along its circumference by an arc that spans an angle of 220° to 270°, which naturally provides for an optimum level of precision.

The bridge 91 that is fastened to the machine frame 1 at both ends can be simultaneously used to stabilize the machine frame 1 itself. In some cases, this provides some compensation for the additional material cost for the bridge.

For the sake of completeness, it should be noted that the holder arrangement including the sensors in this fourth exemplary embodiment can correspond to the holder arrangement 49 of the first exemplary embodiment. A bearing arrangement encompassing such a large amount of the spindle unit can in certain cases make it possible to alternatively use a conventional holder arrangement, i.e. a holder arrangement 49 without an integrated auxiliary bearing or ball bearing.

The invention claimed is:

1. A device for measuring the rotational imbalance of a specimen, comprising:
    a spindle unit with a spindle, which is embodied to hold the specimen and to allow the specimen to rotate at a testing speed;
    a holder suspension by which the spindle unit is anchored to a machine base in pendulum fashion such that the imbalance forces occurring, during the measurement operation are able to move the spindle unit back and forth in a predetermined measuring direction (M); and
    a sensor arrangement that detects at least one imbalance parameter occurring in the measuring direction (M) during rotation of the spindle;
    wherein the spindle unit is supported by at least one auxiliary bearing, that is only able to transmit forces in a direction normal (N) to the measuring direction (M).

2. The device as recited in claim 1, wherein the auxiliary bearing includes only a single rolling element.

3. The device as recited in claim 1, wherein the auxiliary bearing includes two individual rolling elements, which are essentially situated diametrically opposite each other with respect to the circumference of the spindle unit, or four individual rolling elements, which enclose an angle (W) of 80 to 100 degrees between one another on the circumference of the spindle unit.

4. The device as recited in claim 1, wherein the at least one auxiliary bearing is a ball, which is held in captive fashion between one recess on the side of the spindle unit and another recess on the side of the machine base in a way that permits the ball to move freely in the measuring direction (M) during the imbalance-induced deflection, without falling out.

5. The device as recited in claim 4, wherein the recesses are situated opposite each other along an axis (A) that is situated in a plane parallel to the measuring direction (M).

6. The device as recited in claim 1, wherein the at least one auxiliary bearing includes a ball bearing ring, via which a support ring of the spindle unit rests against a counterpart ring associated with the machine base.

7. The device as recited in claim 1, wherein the holder suspension includes two holder elements that are able to move relative to each other in an essentially transverse fashion in the predetermined measuring, direction (M) and are connected to each other in an essentially rigid fashion in at least one direction (N) perpendicular to this, wherein one of the holder elements is fixed relative to the spindle unit and the other holder element is fixed relative to the machine base.

8. The device as recited in claim 7, wherein the holder elements are spaced apart from each other and are secured to each other by a plurality of spacers that offer essentially no bending resistance in the measuring direction and are essentially rigid in the spacing direction.

9. The device as recited in claim 8, wherein the spacers are embodied in the form of leaf springs whose main plane extends essentially perpendicular to the measuring direction.

10. The device as recited in claim 9, wherein the leaf springs are linked to the two holder elements in rotatable fashion around rotation axes that extend essentially parallel to the measuring direction.

11. The device as recited in claim 8, wherein the spacers are embodied in the form of rods that are linked to both holder elements in articulating fashion and whose rod axes each extend in the direction of the spacing of the holder elements and whose articulation axes each extend normal to the measuring direction.

12. The device as recited in claim 7, wherein the sensor arrangement has at least one sensor that is held between the two holder elements and is acted on by signals when the two holder elements move relative to each other.

13. The device as recited in claim 7, wherein an auxiliary bearing includes at least one rolling element, which is situated between the holder elements in the holder suspension and by which the holder element fixed relative to the spindle element rests against the holder element fixed relative to the machine base in the direction normal (N) to the measuring direction (M) and the at least one rolling element is situated so that the two holder elements are able to roll against each other in the measuring direction (M) via the rolling element during operation.

14. The device as recited in claim 13, wherein another auxiliary bearing in the form of a counter-bearing is provided, which is situated in the holder suspension, diametrically opposite a first auxiliary bearing on the circumference of the spindle unit, and the counter-bearing includes at least one additional rolling element, which supports the spindle unit essentially only in the direction normal (N) to the measuring direction (M).

15. The device as recited in claim 7, wherein the at least one auxiliary bearing includes a ball bearing ring via which a support ring of the spindle unit rests against a counterpart ring associated with the machine base; and the ball bearing ring is not completely closed, but instead, only embraces part of the circumference of the spindle element, while one end of the counterpart ring is provided with a fork-shaped section for fastening to the holder element that is fixed relative to the machine base and at least one end remote from this end has a section embodied in the form of a support tab for fastening it to the machine base.

16. The device as recited in claim 12, wherein the holder elements have projections that extend toward each other in pairs, between which a force sensor is situated.

17. The device as recited in claim 12, wherein the sensor arrangement has two sensors, which are spaced apart from each other in the direction of the rotation axis of the spindle and are secured between the two holder elements, and are supported on the two holder elements, in mirror-image fashion, relative to an axial longitudinal plane of the spindle perpendicular to the measuring direction.

18. The device as recited in claim 17, wherein the at least one auxiliary bearing is situated essentially midway between the two sensors, viewed in the direction along the spindle rotation axis.

19. The device as recited in claim 12, wherein each force sensor is associated with a spring element that prestresses the respective force sensor in the predetermined force measuring direction.

20. The device as recited in claim 19, wherein a force sensor and the spring element associated with it are supported in prestressed fashion one after the other on one of the two holder elements and the other holder element is supported on the force sensor in the path of force between the force sensor and the spring element.

21. The device as recited in claim 19, wherein the force sensor and/or the spring element is/are secured at both ends in the force measuring direction, between deflecting bearings, in particular ball bearings or bearing points.

22. The device as recited in claim 14, wherein the holder suspension and/or the counter-bearing has/have devices in the form of dovetail guides, which fix the position of the holder suspension or of the counter-bearing on the device, independent of assembly.

23. A holder suspension equipped with the defining characteristics relating to the holder suspension as recited in claim 13.

24. A use of a holder suspension for retrofitting, a device as recited in claim 1.

* * * * *

UNITED STATES PATENT AND TRADEMARK OFFICE
CERTIFICATE OF CORRECTION

| | | |
|---|---|---|
| PATENT NO. | : 8,887,565 B2 | Page 1 of 1 |
| APPLICATION NO. | : 13/139978 | |
| DATED | : November 18, 2014 | |
| INVENTOR(S) | : Franz Haimer | |

It is certified that error appears in the above-identified patent and that said Letters Patent is hereby corrected as shown below:

In the Claims,

Column 10, line 3 should read as follows:
occurring[[,]] during

Column 10, line 10 should read as follows:
bearing[[,]] that

Column 10, line 31 should read as follows:
ring[[,]] via

Column 10, line 37 should read as follows:
measuring[[,]] direction

Column 11, line 19 should read as follows:
instead[[,]]

Column 12, line 30 should read as follows:
retrofitting[[,]] a

Signed and Sealed this
Twenty-eighth Day of April, 2015

Michelle K. Lee
*Director of the United States Patent and Trademark Office*